US012789297B2

(12) United States Patent
Huang et al.

(10) Patent No.: US 12,789,297 B2
(45) Date of Patent: Nov. 10, 2026

(54) COOLED WELDING DEVICE

(71) Applicant: CONTEMPORARY AMPEREX TECHNOLOGY (HONG KONG) LIMITED, Hong Kong (CN)

(72) Inventors: Chaoqun Huang, Ningde (CN); Lei Song, Ningde (CN); Guangcheng Zhong, Ningde (CN); Hongtao Li, Ningde (CN); Zhonglin Lai, Ningde (CN); Shengdong Chen, Ningde (CN)

(73) Assignee: CONTEMPORARY AMPEREX TECHNOLOGY (HONG KONG) LIMITED, Hong Kong (HK)

( * ) Notice: Subject to any disclaimer, the term of this patent is extended or adjusted under 35 U.S.C. 154(b) by 696 days.

(21) Appl. No.: 18/346,812

(22) Filed: Jul. 4, 2023

(65) Prior Publication Data

US 2024/0123552 A1 Apr. 18, 2024

Related U.S. Application Data

(63) Continuation of application No. PCT/CN2023/084586, filed on Mar. 29, 2023.

(30) Foreign Application Priority Data

Oct. 17, 2022 (CN) ......................... 202222723111.8

(51) Int. Cl.
*B23K 26/70* (2014.01)
*F28D 7/02* (2006.01)

(52) U.S. Cl.
CPC ............ *B23K 26/703* (2015.10); *F28D 7/024* (2013.01)

(58) Field of Classification Search
None
See application file for complete search history.

(56) References Cited

U.S. PATENT DOCUMENTS

| | | | | |
|---|---|---|---|---|
| 2,146,141 A * | 2/1939 | Harris | F28D 7/022 165/161 |
| 3,875,759 A * | 4/1975 | Malcosky | F28D 7/022 62/394 |
| 4,902,476 A * | 2/1990 | Gordon | B01D 63/02 165/184 |
| 5,408,065 A | 4/1995 | Campbell et al. | |

(Continued)

FOREIGN PATENT DOCUMENTS

| | | |
|---|---|---|
| CN | 105397318 A | 3/2016 |
| CN | 105414780 A | 3/2016 |

(Continued)

OTHER PUBLICATIONS

CN 107255422 A (Wu, Jin-xing et al.) Oct. 17, 2017 [retrieved on Mar. 21, 2026]. Retrieved from Foreign Image and Text database, translation by Clarivate Analytics. (Year: 2017).*

(Continued)

*Primary Examiner* — John J Norton
(74) *Attorney, Agent, or Firm* — ANOVA LAW GROUP, PLLC

(57) ABSTRACT

A welding device includes a laser welding head and a cooling mechanism. The laser welding head is provided with a channel for laser to pass through, and the cooling device is arranged on a side wall of the laser welding head and configured to cool the laser welding head.

13 Claims, 2 Drawing Sheets

(56) References Cited

U.S. PATENT DOCUMENTS

| | | | | |
|---|---|---|---|---|
| 6,293,335 | B1 * | 9/2001 | Tawney | F28D 7/024 165/184 |
| 6,298,687 | B1 * | 10/2001 | Dienhart | F28D 7/024 62/513 |
| 6,802,366 | B1 * | 10/2004 | Dillon | F28F 1/22 29/890.044 |
| 2005/0061788 | A1 * | 3/2005 | Nagai | B23K 26/703 219/121.75 |
| 2006/0124285 | A1 * | 6/2006 | Kite | F28F 1/06 165/163 |
| 2010/0187209 | A1 * | 7/2010 | Miyazaki | B23K 26/38 219/121.84 |

FOREIGN PATENT DOCUMENTS

| | | | | |
|---|---|---|---|---|
| CN | 107255422 | A * | 10/2017 | F28F 9/12 |
| CN | 108311802 | A * | 7/2018 | B23K 26/703 |
| CN | 210334798 | U | 4/2020 | |
| CN | 210548843 | U | 5/2020 | |
| CN | 212311178 | U | 1/2021 | |
| CN | 213827598 | U | 7/2021 | |
| CN | 113263264 | A * | 8/2021 | B23K 37/0443 |
| CN | 114024190 | A | 2/2022 | |
| CN | 216177570 | U | 4/2022 | |
| CN | 218396445 | U | 1/2023 | |
| EP | 0216728 | A1 | 4/1987 | |
| FR | 2671503 | A1 | 7/1992 | |
| KR | 102228075 | B1 | 3/2021 | |

OTHER PUBLICATIONS

CN 108311802 A (Li, Qiang et al.) Jul. 24, 2018 [retrieved on Mar. 21, 2026]. Retrieved from Foreign Image and Text database, translation by Clarivate Analytics. (Year: 2018).*

The World Intellectual Property Organization (WIPO) International Search Report for PCT/CN2023/084586 Apr. 23, 2023 7 pages (including English translation).

The European Patent Office (EPO) The Extended European Search Report for Application No. 23730695.6 Nov. 6, 2024 6 Pages.

* cited by examiner

COOLED WELDING DEVICE

CROSS-REFERENCE TO RELATED APPLICATIONS

The present application is a continuation of International Application No. PCT/CN2023/084586, filed Mar. 29, 2023, which claims priority to Chinese Patent Application No. 202222723111.8 filed on Oct. 17, 2022, entitled "WELDING DEVICE", the entire contents of which are incorporated herein by reference.

TECHNICAL FIELD

The present application relates to the technical field of welding, and in particular, to a welding device.

BACKGROUND

In the field of battery production, top cover welding is one of the important processes, and its principle is to weld the top cover and case by laser. However, during the welding process, at least some structures in the welding device will be heated and deformed, which affects the reliability of laser welding.

SUMMARY

In view of the above problems, the present application provides a welding device that can improve the welding effect.

An embodiment of the present application provides a welding device, which comprises a laser welding head and a cooling mechanism, wherein the laser welding head is provided with a channel for laser to pass through, and the cooling device is arranged on a side wall of the laser welding head and used for cooling the laser welding head.

In the above solution, the cooling mechanism is arranged on a side wall of the laser welding head, and the cooling mechanism can cool the laser welding head in the process of welding using the laser welding head, which reduces the risk of high-temperature deformation of the laser welding head due to too high temperature, improves the laser welding effect and prolongs the service life of the welding device.

In some embodiments, the laser welding head comprises a nozzle and a connecting pipe connected to the nozzle, and the cooling mechanism is sleeved on the outer periphery of the connecting pipe.

In the above solution, the cooling mechanism is sleeved on the outer periphery of the connecting pipe, which can improve the reliability of the relative position between the laser welding head and the cooling mechanism and reduce the risk of separation of the cooling mechanism from the laser welding head. Moreover, compared with arranging the cooling mechanism on the nozzle, this design can also increase the size of the cooling mechanism to a certain extent, thus improving the cooling effect on the laser welding head.

In some embodiments, the connecting pipe comprises an outer wall surface and a accommodating groove formed by the outer wall surface recessed inwards, and at least part of the cooling mechanism is located in the accommodating groove.

In the above solution, the connecting pipe is provided with an accommodating groove, and at least part of the cooling mechanism is arranged in the accommodating groove. Compared with other ways, the design of the accommodating groove can play a role in fixing the cooling mechanism and the laser welding head to a certain extent to reduce the risk of relative displacement between them.

In some embodiments, the welding device further comprises a limiting assembly arranged at a side of the cooling mechanism away from the accommodating groove, and the limiting assembly is connected to the connecting pipe.

In the above solution, the position of the cooling mechanism is limited by arranging the limiting assembly, which reduces the risk of separation of the cooling mechanism from the laser welding head to ensure that the cooling mechanism can always cool the laser welding head, and improve the reliability of the whole structure.

In some embodiments, there are a plurality of limiting assemblies, and the plurality of limiting assemblies are arranged at intervals along the circumferential direction of the connecting pipe.

In the above solution, by arranging a plurality of limiting assemblies, the limiting effect of the limiting assemblies on the cooling mechanism can be improved, thereby further reducing the risk of separation of the cooling mechanism from the connecting pipe and improving the reliability.

In some embodiments, the limiting assembly and the accommodating groove clamp the cooling mechanism.

In the above solution, the limiting assembly and the accommodating groove clamp the cooling mechanism, thereby reducing the risk of unnecessary shaking of the cooling mechanism and improving the reliability of the relative position between the cooling mechanism and the laser welding head during the use of the welding device.

In some embodiments, at least part of the cooling mechanism protrudes from the accommodating groove, and the at least part of the cooling mechanism protruding from the accommodating groove abuts against the limiting assembly.

In the above solution, at least part of the cooling mechanism protrudes from the accommodating groove, so that the cooling mechanism can have a larger size, thereby achieving a better cooling effect on the laser welding head. On this basis, the existence of the limiting assembly can prevent the cooling mechanism from separating from the laser welding head while ensuring that the cooling mechanism will not shake relatively during the use of the welding device, thus improving the welding effect.

In some embodiments, the connecting pipe and the nozzle are made of thermally conductive materials.

In the above solution, the connecting pipe and the nozzle are made of thermally conductive materials, and the cooling effect of the cooling mechanism on the connecting pipe can be conducted to the nozzle, so that the nozzle can be cooled at the same time, the temperature of the nozzle can be reduced, the risk of deformation of the nozzle due to too high temperature can be reduced, and the use reliability of the welding device can be improved.

In some embodiments, the thermal conductivity of the thermally conductive material is A, wherein $A \geq 200$ W/m·K.

In the above solution, the thermal conductivity A of the thermally conductive material is set to be not less than 200 W/m·K, so that the cooling effect of the cooling mechanism can be transmitted to the nozzle in time, so as to realize the timely cooling of the nozzle and improve the cooling effect of the cooling mechanism on the nozzle. Moreover, if the thermal conductivity is too high, the temperature of the nozzle and the connecting pipe will easily increase sharply during the working process of the welding device, which is not conducive to the long-term use of the welding device. Therefore, the embodiment of the present application also sets the thermal conductivity A of the thermally conductive material to be not more than 500 W/m·K, so as to ensure the long-term use of the welding device.

In some embodiments, the thermally conductive material comprises at least one of copper and aluminum.

In the above solution, both copper and aluminum are metal materials with strong heat conduction effect. By setting the connecting pipe and the nozzle to comprise at least one of copper and aluminum, it can ensure that the cooling effect of the cooling mechanism can be transmitted to the nozzle in time, so as to realize the timely cooling of the nozzle. Moreover, compared with other materials, copper and aluminum are more common and cheaper, so the cost of the welding device can be reduced to a certain extent, which is conductive to large-scale production and use.

In some embodiments, the cooling mechanism comprises a cooling pipe for transporting a cooling medium.

In the above solution, by arranging the cooling pipe spirally wound outside the laser welding head and conveying the cooling medium into the cooling pipe, part of the heat of the laser welding head can be taken away, so as to realize the cooling effect. This structure is simple and reliable, which is conductive to production and manufacturing.

In some embodiments, there are a plurality of cooling pipes, which are arranged side by side in the extending direction of the connecting pipe.

In the above solution, compared with the solution with only one cooling tube, the arrangement of a plurality of cooling pipes can reduce the extension length of a single cooling tube, that is, reduce the moving path of the cooling medium, thus improving the cooling effect of the cooling medium on the laser welding head.

In some embodiments, the cooling pipe is fitted to and spirally wound around the connecting pipe.

In the above solution, the cooling pipe is fitted to and spirally wound around the connecting pipe, which means that the shape and size of the annular structure formed by the winding of the cooling pipe are matched with the shape and size of the outer peripheral side wall of the laser welding head. In this way, physical contact between the cooling pipe and the laser welding head can be realized, and the cooling effect of the cooling mechanism on the laser welding head can be improved through physical contact, thus further reducing the risk of deformation of the laser welding head due to high temperature.

In some embodiments, the welding device further comprises a bonding member, and the bonding member is sandwiched between the cooling pipe and the connecting pipe to fix the cooling pipe and the connecting pipe.

In the above solution, a bonding member is sandwiched between the cooling pipe and the connecting pipe, and the bonding member can bond and fix the cooling pipe and the connecting pipe. The existence of the bonding member can improve the connection reliability between the cooling pipe and the connecting pipe, thereby reducing the risk of relative displacement between them and improving the reliability of the welding device.

In some embodiments, the bonding member comprises a thermally conductive adhesive.

In the above solution, the bonding member can not only improve the position reliability between the cooling pipe and the connecting pipe, but also conduct heat, thus helping the cooling mechanism to better cool the laser welding head and improving the cooling effect.

In the above solution, the cooling device is sandwiched between a gas generating device and a battery, and the cooling device is used for cooling the gas generated by the gas generating device, so that the gas can better cool the battery, thereby further reducing the risk of thermal runaway and open flame of the battery.

The above description is only an overview of the technical solutions of the present application. In order to understand the technical means of the present application more clearly, it can be implemented according to the contents of the specification, and in order to make the above and other objectives, features and advantages of the present application more obvious and understandable, specific embodiments of the present application are enumerated below.

DESCRIPTION OF DRAWINGS

In order to explain the technical solutions of the embodiments of the present application more clearly, the drawings that need to be used in the embodiments of the present application will be briefly introduced below. Obviously, the drawings described below are only some embodiments of the present application, based on which other drawings can be obtained by those of ordinary skill in the art without creative work.

In the drawings.

Figure 1:
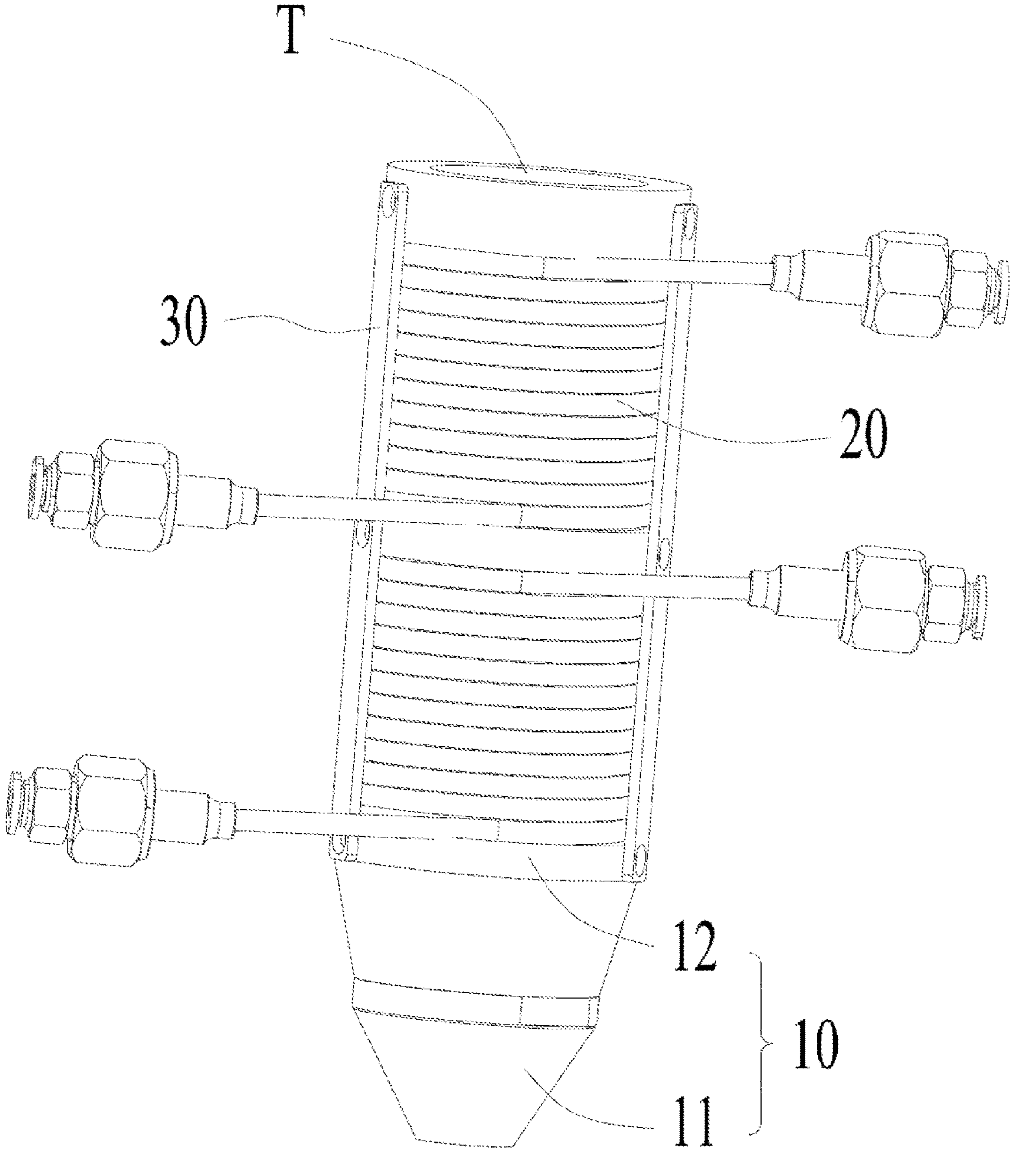
FIG. 1 is a schematic structural diagram of a welding device provided by an embodiment of the present application.

10. Laser welding head; 11. Nozzle; 12. Connecting pipe;

20. Cooling mechanism; 21. Cooling pipe;

30. Limiting assembly;

T. Channel; M. Outer wall surface; A. Accommodating groove.

DETAILED DESCRIPTION

Hereinafter, the embodiments of the technical solutions of the present application will be described in detail with the drawings. The following embodiments are only used to explain the technical solutions of the present application more clearly, so they are only used as examples and cannot be used to limit the protection scope of the present application.

Unless otherwise defined, all technical and scientific terms used herein have the same meaning as commonly understood by those skilled in the art to which the present application pertains. The terms used herein are only for the purpose of describing specific embodiments and are not intended to limit the present application. The terms "including" and "having" in the specification and claims of the present application and the above description of drawings, as well as any variations thereof, are intended to cover non-exclusive inclusion.

In the description of the embodiments of the present application, the technical terms "first" and "second" or the like are only used to distinguish different objects, and cannot be understood as indicating or implying relative importance or implicitly indicating the number, specific order or primary-secondary relationship of the indicated technical features. In the description of the embodiments of the present application, the meaning of "a plurality of" is more than two, unless otherwise specifically defined.

Reference to "an embodiment" herein means that a particular feature, structure, or characteristic described in connection with an embodiment can be comprised in at least one embodiment of the present application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In the description of the embodiments of the present application, the term "and/or" is only an association relationship that describes the associated objects, which means that there can be three kinds of relationships. For example, A and/or B can refer to the three situations that A exists alone, A and B exist at the same time, and B exists alone. In addition, the character "I" herein generally indicates that the associated objects are in an "or" relationship. In this disclosure, the phrases "at least one of A, B, and C" and "at least one of A, B, or C" both mean only A, only B, only C, or any combination of A, B, and C.

In the description of the embodiments of the present application, the term "a plurality of" refers to more than two (including two), similarly, "a plurality of groups" refers to more than two groups (including two groups), and "a plurality of sheets" refers to more than two sheets (including two sheets).

In the description of the embodiments of the present application, the technical terms "central", "longitudinal", "horizontal", "length", "width", "thickness", "upper", "lower", "front", "behind", "left", "right", "vertical", "transverse", "top", "bottom", "inside", "outside", "clockwise", "counterclockwise", "axial", "radial", "circumferential" and the like indicate orientation or position relationships based on the orientations or positions shown in the drawings. They are only for the convenience of describing the embodiments of the present application and simplifying the description, rather than indicating or implying that the referred device or element must have a specific orientation, be constructed and operated in a specific orientation, so they cannot be understood as limiting the embodiments of the present application.

In the description of the embodiments of the present application, unless otherwise specified and defined, technical terms such as "installing", "linking", "connecting" and "fixing" should be broadly understood. For example, it can be a fixed connection, a detachable connection or an integrated connection; it can also be a mechanical connection or an electrical connection; it can be a direct connection, can also be an indirect connection through an intermediary, and can be an internal communication of two elements or the interaction between two elements. For those skilled in the art, the specific meanings of the above terms in the embodiments of the present application can be understood according to the specific situation.

In the related art, the top cover and the case of the battery are welded by laser welding, and the inventors noticed that the laser welding head in the welding device is prone to high-temperature deformation during the welding process, thus reducing the effect of laser welding.

The inventors found that this is because the laser welding head needs to be tilted at a certain angle during the welding process to prevent the laser from being reflected by the work-piece and returning along the optical path to damage the laser welding head. However, as the laser welding head is tilted at a certain angle, the laser is still emitted to the laser welding head through reflection, which will increase the temperature of the laser welding head. In addition, the laser welding head is affected by the thermal radiation of laser welding, which will also make its temperature increase sharply. Under the condition of long-term high temperature, the laser welding head is prone to oxidation and ablation, which leads to the roughness and deformation of the surface of the laser welding head, affects the protective effect of the welding shielding gas, and then affects the laser welding effect, resulting in defects such as bumpy spots and wavy lines on the weld surface, and decreased welding yield.

In addition, with the continuous development of the battery industry, the welding JPH of the top cover is constantly increased, which means that more and more welding heat will be accumulated on the laser welding head, which accelerates the burning deformation of the laser welding head and seriously affects the laser welding yield.

Based on the above technical problems, the present application provides a welding device, where the laser welding head can be cooled to reduce the risk of high-temperature deformation of the laser welding head.

It should be noted that the welding device provided in the present application can be used for welding battery cases and end covers, and can also be used for welding operations in other fields, which is not limited in the present application.

The structure of the welding device will be described in detail in conjunction with the drawings.

Referring to FIG. 1, an embodiment of the present application provides a welding device, which comprises a laser welding head 10 and a cooling mechanism 20. The laser welding head 10 is provided with a channel T for laser to pass through, and the cooling device is arranged on a side wall of the laser welding head 10 and used for cooling the laser welding head 10.

As a part of the welding device, the laser welding head 10 is mainly used to guide the laser to be ejected from the welding device. The laser welding head 10 has a hollow structure, a channel T is arranged inside it, the channel T is communicated with the external environment, and the laser can exit the laser welding head 10 through the channel T.

The laser welding head 10 can be of various shapes and sizes. Specifically, the shape of the laser welding head 10 can be determined according to the size and shape of the internal channel T. Moreover, the laser welding head 10 can be made of a variety of materials, such as copper, stainless steel, and aluminum alloy, which is not particularly limited in the embodiments of the present application.

The cooling mechanism 20 is arranged on the side wall of the laser welding head 10, and the cooling mechanism 20 can be arranged on the inner side wall of the laser welding head 10 or on the outer side wall of the laser welding head 10, which is not limited in the embodiments of the present application. Moreover, the cooling mechanism 20 can be connected and fixed to the side wall by welding or bonding, or the cooling mechanism 20 can abut against and be in contact with the side wall only by sleeving, etc., which is not limited in the embodiments of the present application.

There are many possibilities for the specific implementation of the cooling mechanism 20, which is not limited in the embodiments of the present application. For example, the cooling mechanism 20 may be a radiator with a structure similar to a fan or the like, or the cooling mechanism 20 may also be a heat exchange structure for cooling by conveying a cooling medium or the like.

In the embodiments of the present application, the cooling mechanism 20 is arranged on the side wall of the laser welding head 10. In the process of welding using the laser welding head 10, the cooling mechanism 20 can cool the laser welding head 10, thereby reducing the risk of high-temperature deformation of the laser welding head 10 due to too high temperature, and improving the laser welding effect and the service life of the welding device.

Figure 2:
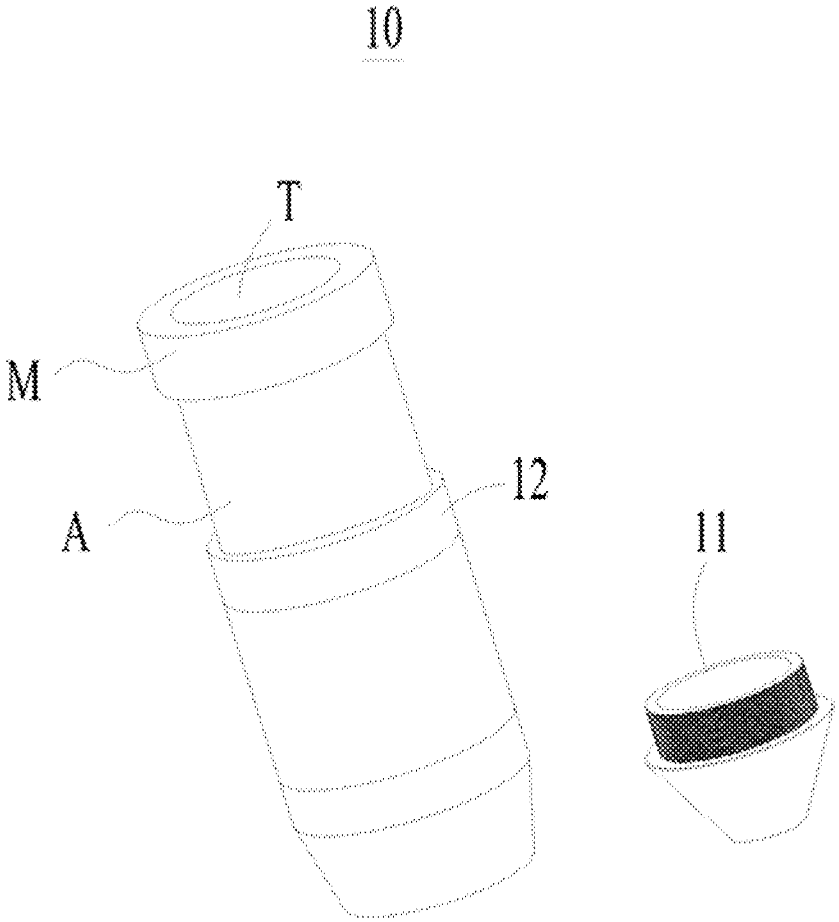
FIG. 2 is an exploded schematic structural diagram of a laser welding head in a welding device provided by an embodiment of the present application.

In some embodiments, referring to FIGS. 1 and 2, the laser welding head 10 comprises a nozzle 11 and a connecting pipe 12 connected to the nozzle 11, and the cooling mechanism 20 is sleeved on the outer periphery of the connecting pipe 12.

The nozzle 11 and the connecting pipe 12 are fixedly connected, comprising but not limited to by threaded connection and welding. Here, the nozzle 11 and the connecting pipe 12 may be made of the same material, or the nozzle 11 and the connecting pipe 12 may be made of different materials, which is not limited in the embodiments of the present application.

The nozzle 11 and the connecting pipe 12 are both hollow structures, and the space existing in them together constitutes a channel T through which laser passes. The connecting pipe 12 may have a hollow tubular structure, which may be a square pipe or a circular pipe. The nozzle 11 can have a hollow cone structure, which can be a circular cone, a triangular cone, a quadrangular cone and other structures.

In general, the nozzle 11 is small in size relative to the connecting pipe 12. If the cooling mechanism 20 is arranged at the nozzle 11, the problem of poor fitting between the cooling mechanism 20 and the laser welding head 10 will easily occur, leading to the separation of the cooling mechanism 20 from the laser welding head 10 easily, which is not conducive to the cooling effect of the cooling mechanism 20 on the laser welding head 10.

On this basis, in the embodiments of the present application, the cooling mechanism 20 is sleeved on the outer periphery of the connecting pipe 12, and the cooling mechanism 20 can be shaped into an annular structure by winding or the like, and then the annular structure is sleeved on the outer periphery of the connecting pipe 12. Among others, the cooling mechanism 20 can be in close contact with the connecting pipe 12 to fix the position between them, or the cooling mechanism 20 can be fixed to the connecting pipe 12 by other structures instead of being in contact with the outer peripheral side wall of the connecting pipe 12, which is not limited in the embodiments of the present application.

In addition, the cross-sectional shape of the annular structure formed by the cooling mechanism 20 may be matched with the cross-sectional shape of the connecting pipe 12, or the cross-sectional shape of the annular structure may be different from the cross-sectional shape of the connecting pipe 12, which is not limited in the embodiments of the present application.

In the embodiments of the present application, the cooling mechanism 20 is sleeved on the outer periphery of the connecting pipe 12, which can improve the reliability of the relative position between the laser welding head 10 and the cooling mechanism 20, and reduce the risk of separation of the cooling mechanism 20 from the laser welding head 10. Moreover, compared with arranging the cooling mechanism 20 on the nozzle 11, this design can also increase the size of the cooling mechanism 20 to a certain extent, thus improving the cooling effect on the laser welding head 10.

In some embodiments, as shown in FIGS. 1 and 2, the connecting pipe 12 comprises an outer wall surface M and an accommodating groove A formed by the inner wall surface M recessed inwards, and at least part of the cooling mechanism 20 is located in the accommodating groove A.

The outer wall surface M is the outer peripheral surface of the connecting pipe 12, and at least part of the outer wall surface M is recessed in the direction close to the channel T, thus forming an accommodating groove A for accommodating at least some of the structures in the cooling mechanism 20. Among others, there may be one or a plurality of accommodating grooves A. When there are a plurality of accommodating grooves A, the plurality of accommodating grooves A may be arranged at intervals in the extending direction of the channel T.

At least part of the cooling mechanism 20 is located in the accommodating groove A, wherein at least part of the cooling mechanism 20 can be completely located in the accommodating groove A or can protrude from the accommodating groove A, which is not limited in the embodiments of the present application. The accommodating groove A can play a certain role in locking the cooling mechanism 20, reducing the risk of the cooling mechanism 20 moving relative to the laser welding head 10 and improving the reliability of the relative position between the cooling mechanism 20 and the laser welding head 10. Among others, the accommodating groove A can be cut out by a cutting process.

In the embodiments of the present application, the connecting pipe 12 is provided with an accommodating groove A, and at least part of the cooling mechanism 20 is arranged in the accommodating groove A. Compared with other ways, the design of the accommodating groove A can play a role in fixing the cooling mechanism 20 and the laser welding head 10 to a certain extent, and reduce the risk of relative displacement between them.

In some embodiments, the welding device further comprises a limiting assembly 30 disposed at a side of the cooling mechanism 20 away from the accommodating groove A, and the limiting assembly 30 is connected to the connecting pipe 12.

The limiting assembly 30 is connected to the connecting pipe 12 in ways comprising but not limited to welding and bolt connection. The limiting assembly 30 is mainly used to limit the position of the cooling mechanism 20. Specifically, the limiting assembly 30 is located on a side of the cooling mechanism 20 away from the accommodating groove A. Because the limiting assembly 30 is connected to the connecting pipe 12, the position of the limiting assembly 30 relative to the connecting pipe 12 remains fixed all the time. If the part of the cooling mechanism 20 located in the accommodating groove A is separated from the accommodating groove A, this part of structure will be in contact with the limiting assembly 30, and the limiting assembly 30 will prevent the cooling mechanism 20 from further moving away from the connecting pipe 12, so that the relative position between the cooling mechanism 20 and the connecting pipe 12 is within a preset range, thus ensuring that the cooling mechanism 20 can cool the laser welding head 10.

There may be one or a plurality of limiting assemblies 30, which is not limited in the embodiments of the present application. Moreover, the structure of the limiting assembly 30 is also not limited in the embodiments of the present application. For example, the limiting assembly 30 has a strip-shaped structure, the length of the strip-shaped structure in the extending direction of the through hole is greater than the length of the accommodating groove A in the extending direction of the through hole, and both ends of the strip-shaped structure are respectively connected and fixed to the connecting pipe 12.

In the embodiments of the present application, the position of the cooling mechanism 20 is limited by arranging the limiting assembly 30, so as to reduce the risk of separation of the cooling mechanism 20 from the laser welding head

10, ensure that the cooling mechanism 20 can always cool the laser welding head 10, and improve the reliability of the overall structure.

In some embodiments, there are a plurality of limiting assemblies 30, and the limiting assemblies 30 are arranged at intervals along the circumferential direction of the connecting pipe 12.

A plurality of limiting assemblies 30 are used for limiting the cooling mechanism 20, and the plurality of limiting assemblies 30 are arranged at intervals. Exemplarily, a plurality of limiting assemblies 30 are arranged at intervals around the circumferential side of the connecting pipe 12 at the same preset angle.

In the embodiments of the present application, by arranging a plurality of limiting assemblies 30, the limiting effect of the limiting assemblies 30 on the cooling mechanism 20 can be improved, thereby further reducing the risk of separation of the cooling mechanism 20 from the connecting pipe 12 and improving the reliability.

In some embodiments, the limiting assembly 30 and the accommodating groove A clamp the cooling mechanism 20.

"Clamping" mentioned in the embodiments of the present application means that the limiting assembly 30 and the accommodating groove A are in contact with the cooling mechanism 20 at the same time, that is, the space formed by the clamping of the limiting assembly 30 and the accommodating groove A is matched with the size of the cooling mechanism 20, and they jointly limit the position of the cooling mechanism 20.

Optionally, the depth of the accommodating groove A may be set to be the same as the size of the cooling mechanism 20, and the surface of the limiting assembly 30 facing the cooling mechanism 20 is flush with the outer wall surface M. Alternatively, the depth of the accommodating groove A can be set to be larger than the size of the cooling mechanism 20, and at this time, part of the surface of the limiting assembly 30 facing the cooling mechanism 20 penetrates into the inner wall of the accommodating groove A, so as to limit the position of the cooling mechanism 20.

In the embodiments of the present application, the limiting assembly 30 and the accommodating groove A clamp the cooling mechanism 20, thereby reducing the risk of unnecessary shaking of the cooling mechanism 20 during the use of the welding device and improving the reliability of the relative position between the cooling mechanism 20 and the laser welding head 10.

In some embodiments, at least part of the cooling mechanism 20 protrudes from the accommodating groove A, and the at least part of the cooling mechanism 20 protruding from the accommodating groove A abuts against the limiting assembly 30.

At least part of the cooling mechanism 20 protrudes from the accommodating groove A, so that the cooling mechanism 20 can have a larger size, thereby achieving a better cooling effect on the laser welding head 10. On this basis, the existence of the limiting assembly 30 can prevent the cooling mechanism 20 from being separated from the laser welding head 10, and ensure that the cooling mechanism 20 will not shake relatively during the use of the welding device, thus improving the welding effect.

In some embodiments, the connecting pipe 12 and the nozzle 11 are made of thermally conductive materials.

As can be seen from the foregoing, since the nozzle 11 is small in size, the cooling mechanism 20 is arranged on the connecting pipe 12, so that the cooling mechanism 20 and the laser welding head 10 can be relatively fixed. On this basis, in order to ensure that the cooling mechanism 20 can cool the nozzle 11 at the same time, in the embodiments of the present application, the connecting pipe 12 and the nozzle 11 are made of thermally conductive materials, and the cooling effect of the cooling mechanism 20 on the connecting pipe 12 can be conducted to the nozzle 11, so that the nozzle 11 can be cooled at the same time, the temperature of the nozzle 11 can be reduced, the risk of deformation of the nozzle 11 due to too light temperature can be reduced, and the use reliability of the welding device can be improved.

It should be noted that the specific composition of the thermally conductive material is not limited in the embodiments of the present application. The embodiments of the present application also do not limit the thermal conductivity of the thermally conductive material. Exemplarily, the thermally conductive material comprises a metal or alloy material.

In some embodiments, the thermal conductivity of the thermally conductive material is A, wherein 500 W/m·K≥A≥200 W/m·K. Exemplarily, A is one of 200 W/m·K, 300 W/m·K, 400 W/m·K and 500 W/m·K.

The higher the thermal conductivity, the higher the thermal conductivity of the corresponding material, that is, the better the thermal conduction effect. In the embodiments of the present application, the thermal conductivity A of the thermally conductive material is set to be not less than 200 W/m·K, so that the cooling effect of the cooling mechanism 20 can be transmitted to the nozzle 11 in time, so as to realize the timely cooling of the nozzle 11 and improve the cooling effect of the cooling mechanism 20 on the nozzle 11. At the same time, if the thermal conductivity is too high, the temperature of the nozzle 11 and the connecting pipe 12 is prone to sharp increase during the working process of the welding device, which is not conducive to the long-term use of the welding device. Therefore, the embodiments of the present application further set the thermal conductivity A of the thermally conductive material to be not more than 500 W/m·K to ensure the long-term use of the welding device.

In some embodiments, the thermally conductive material comprises at least one of copper and aluminum.

Both copper and aluminum are metal materials with strong thermal conductivity. By arranging the connecting pipe 12 and the nozzle 11 comprising at least one of copper and aluminum, it can ensure that the cooling effect of the cooling mechanism 20 can be transmitted to the nozzle 11 in time, so as to realize the timely cooling of the nozzle 11. At the same time, compared with other materials, copper and aluminum are more common and cheaper, so the cost of the welding device can be reduced to a certain extent, which is conductive to large-scale production and use.

Figure 3:
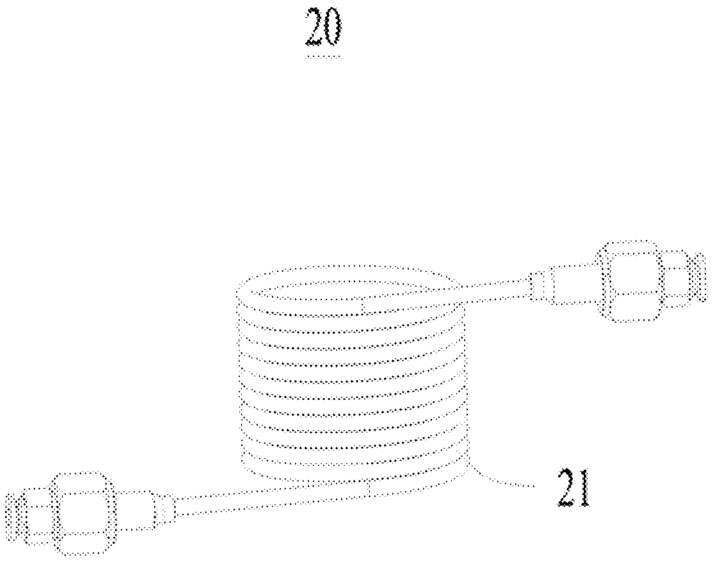
FIG. 3 is a schematic structural diagram of a cooling mechanism in a welding device provided by an embodiment of the present application.

In some embodiments, referring to FIGS. 1 to 3, the cooling mechanism 20 comprises a cooling pipe 21 for transporting a cooling medium.

The cooling pipe 21 has a tubular structure, and the cooling pipe 21 can be spirally wound around the side wall of the laser welding head 10. The cooling pipe 21 has an opposite inlet and outlet, and the cooling medium can enter the inside of the cooling pipe 21 through the inlet, then be transported along the internal path of the cooling pipe 21, and finally leave the cooling pipe 21 through the outlet. In this process, the cooling medium will take away part of the heat in the laser welding head 10, thus achieving the cooling effect on the laser welding head 10.

The specific material of the cooling medium is not limited in the embodiments of the present application. Among others, the cooling medium can be a liquid working medium or a gaseous working medium. Optionally, the cooling medium is a gaseous working medium, so that even if the cooling pipe 21 is damaged, the leaked cooling medium will not have too much influence on the welding effect, thus ensuring the reliable welding process.

In the embodiments of the present application, by arranging the spirally wound cooling pipe 21 outside the laser welding head 10 and conveying the cooling medium into the cooling pipe 21, part of the heat of the laser welding head 10 can be taken away, so as to realize the cooling effect. This structure is simple and reliable, which is conductive to production and manufacturing.

In some embodiments, there are a plurality of cooling pipes 21, and the plurality of cooling pipes 21 are arranged side by side in the extending direction of the connecting pipe 12.

The plurality of cooling pipes 21 may be arranged at intervals or adjacent to each other. Each cooling pipe 21 is provided with a corresponding inlet and outlet, and each cooling pipe 21 can transmit the same cooling medium or different cooling media. Optionally, the number of accommodating grooves A is the same as the number of cooling pipes 21, and the plurality of cooling pipes 21 are respectively arranged corresponding to different accommodating grooves A.

If the length of the cooling pipe 21 is too long, the moving path of the corresponding cooling medium will be too long, which will easily lead to too high temperature of the cooling medium near the outlet position of the cooling pipe 21, which will be detrimental to its cooling effect on the laser welding head 10.

In the embodiments of the present application, compared with the solution that only one cooling pipe 21 is provided, a plurality of cooling pipes 21 are provided, so that the extension length of a single cooling pipe 21 can be reduced, that is, the moving path of the cooling medium can be reduced, thereby improving the cooling effect of the cooling medium on the laser welding head 10.

In some embodiments, as shown in FIGS. 1 to 3, the cooling pipe 21 is fitted to and spirally wound around the connecting pipe 12.

When the cooling pipe 21 is fitted to and wound around the connecting pipe 12, it shows that the shape and size of the annular structure formed by winding the cooling pipe 21 are matched with the shape and size of the outer peripheral side wall of the laser welding head 10. In this way, physical contact between the cooling pipe 21 and the laser welding head 10 can be realized, and the cooling effect of the cooling mechanism 20 on the laser welding head 10 can be improved through physical contact, thereby further reducing the risk of deformation of the laser welding head 10 due to high temperature.

In some embodiments, the welding device further comprises a bonding member (not shown), and the bonding member is sandwiched between the cooling pipe 21 and the connecting pipe 12 to fix the cooling pipe 21 and the connecting pipe 12.

In the embodiments of the present application, a bonding member is sandwiched between the cooling pipe 21 and the connecting pipe 12, and the bonding member can bond and fix the cooling pipe 21 and the connecting pipe 12. The existence of the bonding member can improve the connection reliability between the cooling pipe 21 and the connecting pipe 12, thereby reducing the risk of relative displacement between them and improving the reliability of the welding device.

In some embodiments, the bonding member comprises a thermally conductive adhesive.

In the embodiments of the present application, the bonding member can not only improve the positional reliability between the cooling pipe 21 and the connecting pipe 12, but also play a role of heat conduction, thus helping the cooling mechanism 20 to better cool the laser welding head 10 and improve the cooling effect.

According to some embodiments of the present application, referring to FIGS. 1 to 3, a welding device comprises a laser welding head 10, a cooling mechanism 20 and a limiting assembly 30. The laser welding head 10 is provided with a channel T for laser to pass through, and the laser welding head 10 comprises a nozzle 11 and a connecting pipe 12 connected to the nozzle 11. The connecting pipe 12 comprises an outer wall surface M and an accommodating groove A formed by the outer wall surface M recessed inwards. The cooling mechanism 20 comprises a cooling pipe 21, and at least part of the cooling pipe 21 protrudes from at least part of the accommodating groove A. The limiting assembly 30 is located on a side of the cooling mechanism 20 away from the accommodating groove A and clamps the cooling mechanism 20 together with the accommodating groove A.

Finally, it should be noted that the above embodiments are only used to illustrate rather than limit the technical solutions of the present application. Although the present application has been described in detail with reference to the foregoing embodiments, it should be understood by those skilled in the art that the technical solutions described in the foregoing embodiments can still be modified, or some or all of their technical features can be replaced by equivalents. These modifications or replacements do not make the essence of the corresponding technical solutions deviate from the scope of the technical solutions of various embodiments of the present application, but should be comprised in the scope of the claims and specification of the present application. In particular, as long as there is no structural conflict, the technical features mentioned in each embodiment can be combined in any way. The present application is not limited to the specific embodiments disclosed herein, but comprises all technical solutions falling within the scope of the claims.

What is claimed is:

1. A welding device, comprising:

a laser welding head, provided with a channel for a laser to pass through;

a cooling mechanism, arranged on a side wall of the laser welding head and configured to cool the laser welding head; and a plurality of limiting assemblies;

wherein the laser welding head comprises a nozzle and a connecting pipe connected to the nozzle, the cooling mechanism is sleeved on an outer periphery of the connecting pipe, the plurality of limiting assemblies are arranged at intervals along a circumferential direction of the connecting pipe, and each of the plurality of limiting assemblies is arranged at a side of the cooling mechanism and connected to the connecting pipe.

2. The welding device according to claim 1, wherein the connecting pipe comprises an outer wall surface and an accommodating groove formed by the outer wall surface recessed inwards, and at least part of the cooling mechanism is located in the accommodating groove.

3. The welding device according to claim 2, wherein:

the side of the cooling mechanism is away from the accommodating groove.

4. The welding device according to claim 3, wherein each of the plurality of limiting assemblies and the accommodating groove clamp the cooling mechanism.

5. The welding device according to claim 4, wherein at least part of the cooling mechanism protrudes from the accommodating groove, and the at least part of the cooling mechanism protruding from the accommodating groove abuts against one of the plurality of limiting assemblies.

6. The welding device according to claim 1, wherein the connecting pipe and the nozzle are made of thermally conductive materials.

7. The welding device according to claim 6, wherein a thermal conductivity A of the thermally conductive material satisfies 500 W/m·K≥A≥200 W/m·K.

8. The welding device according to claim 6, wherein the thermally conductive material comprises at least one of copper and aluminum.

9. The welding device according to claim 1, wherein the cooling mechanism comprises a cooling pipe for transporting a cooling medium.

10. The welding device according to claim 9, wherein the cooling pipe is one of a plurality of cooling pipes of the welding device arranged side by side in an extending direction of the connecting pipe.

11. The welding device according to claim 9, wherein the cooling pipe is fitted to and spirally wound around the connecting pipe.

12. A welding device, comprising:

a laser welding head, provided with a channel for a laser to pass through;

a cooling mechanism, arranged on a side wall of the a laser welding head and configured to cool the laser welding head; and a plurality of limiting assemblies;

wherein:

the laser welding head comprises a nozzle and a connecting pipe connected to the nozzle, and the cooling mechanism is sleeved on an outer periphery of the connecting pipe;

the connecting pipe comprises an outer wall surface and an accommodating groove formed by the outer wall surface recessed inwards, and at least part of the cooling mechanism is located in the accommodating groove;

a limiting assembly of the plurality of limiting assemblies is arranged at a side of the cooling mechanism away from the accommodating groove, the limiting assembly is connected to the connecting pipe; and the plurality of limiting assemblies are arranged at intervals along a circumferential direction of the connecting pipe.

13. A welding device, comprising:

a laser welding head, provided with a channel for laser to pass through;

a cooling mechanism, arranged on a side wall of the laser welding head and configured to cool the laser welding head; and a limiting assembly;

wherein:

the laser welding head comprises a nozzle and a connecting pipe connected to the nozzle, and the cooling mechanism is sleeved on an outer periphery of the connecting pipe;

the connecting pipe comprises an outer wall surface and an accommodating groove formed by the outer wall surface recessed inwards, and at least part of the cooling mechanism is located in the accommodating groove;

the limiting assembly is arranged at a side of the cooling mechanism away from the accommodating groove, the limiting assembly is connected to the connecting pipe;

the limiting assembly and the accommodating groove clamp the cooling mechanism; and at least part of the cooling mechanism protrudes from the accommodating groove, and the at least part of the cooling mechanism protruding from the accommodating groove abuts against the limiting assembly.

* * * * *